United States Patent Office 3,808,143
Patented Apr. 30, 1974

3,808,143

COMPOSITION AND METHOD FOR THE DISSOLVING AND COMPLEXING OF GYPSUM

Tommy R. Gardner, Duncan, Okla., assignor to Halliburton Company, Duncan, Okla.

No Drawing. Continuation of abandoned application Ser. No. 48,584, June 1, 1970. This application June 27, 1972, Ser. No. 266,789
Int. Cl. C02b 5/06
U.S. Cl. 252—82 13 Claims

ABSTRACT OF THE DISCLOSURE

A solvent for gypsum comprised of an aqueous solution of salts of alpha-hydroxy carboxylic acids is provided. In addition, there is also provided a process for the removal of gypsum deposits wherein there is utilized a solvent comprised of an aqueous solution of salts of alpha-hydroxy carboxylic acids.

This is a continuation of application Ser. No. 48,584, filed June 1, 1970 and now abandoned.

This invention relates to compositions for the dissolution of gypsum wherein gypsum is contacted with a solvent which coacts with the gypsum to produce water soluble reaction products and/or complexes.

This invention further relates to compositions and methods for use in dissolving and complexing gypsum scales, deposits, and the like.

Throughout this disclosure, illustrative examples, and appended claims, there is made frequent reference to the word "gypsum." Gypsum is accordingly defined as the calcium sulfate compound having two waters of hydration ($CaSO_4 \cdot 2H_2O$).

Deposits of gypsum frequently form in industrial, commercial, and home water systems, and also in subterranean formations used as a source of water and hydrocarbons. These deposits are generally undesirable because they can cause clogging and/or reduced flow in the water system or earthen formations wherever they occur.

Gypsum deposits are found, for example, in producing wells, injection wells, waste disposal systems, boilers and other heat exchange equipment. Deposits of gypsum can significantly reduce the flow of oil and/or water into a well bore by plugging off perforations in the tubing and/or casing. In addition, downhole pumps can become stuck as a result of gypsum scale deposition. Gypsum deposit can form on the surface of tubular goods in a well in such a manner as to severely impede production of fluids.

It is known that carbonate solutions can be used to convert gypsum to calcium carbonate which is then removed with an acid. This method has the disadvantage of requiring the use of an acid to dissolve the calcium carbonate. This method also exhibits reduced effectiveness on dense, laminated gypsum scales, the removal of which requires repeated treatments with the carbonate composition and repeated washings with an acid. Acids are generally undesirable in that they can be corrosive to the system from which the gypsum deposit is sought to be removed.

It is also known that sodium hydroxide and potassium hydroxide can be used with some effectiveness to remove gypsum deposits. The hydroxide converts the gypsum to calcium hydroxide which is soluble in acid. In certain cases, the calcium hydroxide is in the form of a sludge which can be pumped or washed away from the system or formation, while in other instances, an acid must be used to dissolve the reaction precipitate before it can be removed. Although a degree of success has been obtained with the hydroxides, the hydroxides in some cases tend to decrease in effectiveness with repeated treatments, partially because of a buildup of the calcium hydroxide sludge within the system and because of the hydroxide coating formed on the surface of the gypsum deposit. In addition, the hydroxide method sometimes requires the use of an acid to wash away the reaction precipitate which, as previously pointed out, is generally undesirable.

These and other problems are solved by this invention which provides a solvent for gypsum whereby the necessity of an acid treatment to dissolve or otherwise disperse the treated gypsum deposits is eliminated. Furthermore, the gypsum solvent of this invention provides unexpectedly greater gypsum removal per unit quantity of solvent employed than has been heretofore available with the known methods of gypsum removal.

The gypsum solvent of this invention is comprised of an aqueous solution of salts of certain hydroxy substituted carboxylic acids, wherein the solution has a pH in the range of about 7 to about 14. More specifically, the salts are the corresponding salts of alpha-monohydroxy carboxylic acids; and still more specifically, the salts are the corresponding lithium, sodium, potassium, and ammonium salts of alpha-monohydroxy mono and di carboxylic acids.

Thus, in the more specific embodiments of the solvent of this invention, the salts utilized are represented by the general formulae:

(1)

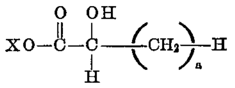

and (2)

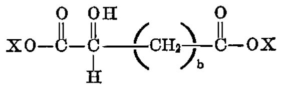

wherein X is selected from the group consisting of sodium, potassium, lithium, and ammonium; *a* is an integer having a value in the range of from 0 to 4; and *b* is an integer having a value in the range of from 0 to 6.

Examples of salts useful herein which are within the scope of Formula 1 include ammonium glycolate, sodium glycolate, potassium glycolate, lithium glycolate, as well as the ammonium, sodium, potassium, and lithium salts of alpha hydroxy propionic acid, alpha hydroxy butanoic acid, alpha hydroxy pentanoic acid, and alpha hydroxy hexanoic acid, wherein ammonium glycolate is the most preferred.

Examples of salts useful herein which are within the scope of Formula 2 include ammonium malate, sodium malate, potassium malate, lithium malate, as well as the ammonium, sodium, potassium, and lithium salts of alpha hydroxy propanedioic acid, alpha hydroxy hexanedioic acid, alpha hydroxy heptanedioic acid, alpha hydroxy octanedioic acid, and alpha hydroxy nonanedioic acid, wherein ammonium malate is the most preferred.

The gypsum solvent of this invention can include a single salt of a single acid, or a combination of salts of different acids. However, for reasons which are to be hereinafter recited, the preferred embodiments from which the best results are obtained are the compositions wherein the solvent is comprised of an aqueous solution of a combination of two salts wherein the first salt is a salt of an alpha hydroxy monocarboxylic acid and the second salt is a salt of an alpha hydroxy dicarboxylic acid and, further, wherein the cationic portions of each salt in the combination are the same, i.e., X in Formula 1 and Formula 2 above is the same in each salt. Thus, for example, one preferred solvent contains potassium glycolate and potassium malate and the most preferred solvent contains about 12.1% ammonium glycolate by total weight of solvent and about 12.5% ammonium malate by total weight of solvent.

Each salt is present in the solvent of this invention in a concentration in the range of about 1 to 55, preferably about 11 to 14, percent by weight by total weight of solvent. Salt concentrations below about 1 percent do not provide satisfactory gypsum removal and salt concentrations above about 55% do not show a corresponding increase in efficiency of gypsum removal.

It is preferred that the total quantity of all salts in the solvent not exceed about 35 percent by weight of the solvent and not be less than about 5 percent by weight of the solvent.

It is also preferred, whenever there is more than one salt in the solvent, that the salts be present in substantially equal concentrations.

It was previously stated that the pH of the solvent of this invention is in the range of about 7 to about 14; however, no substantial improvement in gypsum removal is noted at a pH in excess of about 10, and lowering the pH below 10 may reduce the efficiency of the solvent.

The solvent of this invention when in contact with gypsum reacts with the gypsum to produce as a reaction product the calcium salt of the corresponding acid. Thus, for example, sodium malate reacts with gypsum to form calcium malate, and sodium glycolate reacts with gypsum to form calcium glycolate. This reaction proceeds whether the solvent contains only a single salt or a combination of salts, but the reaction mechanism appears to be different.

It is accordingly my surprising discovery that the reaction product resulting from a solvent containing only a single salt rapidly forms a water soluble precipitate; however, the reaction product resulting from a solvent containing a combination of salts, particularly the above referred to preferred combination, remains in solution for an extended period of time before formation of a water soluble precipitate. Stated differently, it is my discovery that a combination of salts as above defined having a total concentration equal to the concentration of a single salt, also as above defined, holds a greater quantity of reaction product in solution than does the single salt solvent.

I have also discovered that a combination of salts, particularly the above referred to preferred combination, dissolves a greater quantity of gypsum than would be predicted from the individual salts in the combination when acting alone. For example, a solvent combining 12.1 weight percent ammonium glycolate and 12.5 weight percent ammonium malate dissolves a greater quantity of gypsum than the total quantity of gypsum dissolved with two solvents, one having 12.1 weight percent ammonium glycolate and the second having 12.5 weight percent ammonium malate.

It is an advantage of the solvent of this invention that no acid treatment is required subsequent to the solvent treatment. If a sufficient quantity of the preferred solvent is used to treat the gypsum deposit, no precipitate will be formed. However, even if insufficient solvent is used and a precipitate is formed, the precipitate can be readily dissolved in water at the rate of about 0.6 pounds precipitate per gallon of fresh water. Thus, the need for a subsequent acid treatment is eliminated.

The preferred solvent will dissolve in the range of about 0.7 to 0.9, preferably 0.7 to 0.8, pounds of gypsum per gallon of solvent.

Increased efficiency of gypsum removal is another advantage of the solution of this invention. The preferred solvent of the present invention at 72° F. will dissolve in the range of about 0.7 to about 0.9 pounds of quarry-type gypsum per gallon of solvent in 48 hours, while sodium hydroxide will dissolve only from about 0.1 to about 0.5 pounds of quarry-type gypsum per gallon of solution and potassium hydroxide appears to remove no gypsum under the same conditions. A 12% solution of $NH_4HCO_3$-$NaCO_3$ under the same conditions will remove only from about 0.03 to about 0.06 pounds of similar gypsum per gallon of solvent.

Before the sodium hydroxide, potassium hydroxide or $NH_4HCO_3$-$NaCO_3$ will produce efficiencies in the same range as the present invention, they must be followed with an acid wash. The acid wash is a step not required in the present invention.

The efficiencies of the solvents vary depending on the type of gypsum deposits treated. For example, reagent grade gypsum will give the same results in about two hours as most quarry-type gypsum provide in 48 hours.

Gypsum deposits can be treated with the solvent of this invention by contacting the deposit with the solvent. The contact may be a static soaking contact, or it may be a circulation of the solvent past the deposit.

Although it is not a requirement of the invention, a surfactant can be added to the solvent to improve wettability of the gypsum deposits being treated. Anionic, cationic, non-ionic and amphoteric surface active agents can be used with the solvent of the present invention. Examples of some surface active agents useful include octyl phenoxy polyethoxy ethanol, phosphate esters, coco amide betaine, and alkyl dimethyl benzyl ammonium chloride.

The invention will be further illustrated by the following examples. It should be understood, however, that although these examples may describe, in particular detail, some of the more specific features of the invention, they are given primarily for the purpose of illustration; and the invention in its broader aspects is not to be construed as limited by the following examples.

Test procedure

The gypsum solubility tests described below are conducted by placing a weighed quarry-type gypsum block in contact with 100 cubic centimeters of the solvent of this invention for periods of 24, 48, and 72 hours at 72° F. After soaking for 24 hours, the gypsum cube is removed from the solvent, washed with water, dried with acetone and reweighed. The same procedure of washing with water, drying with acetone, and reweighing is used to determine the weight loss of the test cube at 48 and 72 hours, respectively.

EXAMPLE I

Table I shows the amount of gypsum dissolved and complexed in pounds per gallon of the solvent while varying salt concentration, pH, and contact time.

The table also shows observations made as to the presence of a precipitate.

TABLE I

[Solubility of gypsum in glycolate and malate salts and mixtures thereof at various concentrations and pH]

| Solvent | Percent salt | pH | $CaSO_4 \cdot 2H_2O$, lbs./gal. removed 24 hrs. | 48 hrs. | Comments |
|---|---|---|---|---|---|
| Sodium glycolate | 12.88 | 6.0 | 0.359 | 0.668 | Formed small amount of reaction precipitate at 24 hrs. |
| Sodium malate | 11.7 | 8.0 | 0.476 | 0.668 | Do. |
| | | 12.0 | 0.559 | 0.709 | No reaction precipitate at 24 hrs.; small amount at 48 hrs. |
| Ammonium glycolate | 18.15 | 6.0 | 0.325 | 0.442 | Formed small amount of reaction precipitate at 24 hrs. |
| Ammonium malate | 6.25 | | | | |
| | | 8.0 | 0.401 | 0.684 | Do. |
| | | 10.0 | 0.392 | 0.693 | Do. |

TABLE I—Continued

| Solvent | Percent salt | pH | CaSO4·2H2O, lbs./gal. removed 24 hrs. | 48 hrs. | Comments |
|---|---|---|---|---|---|
| Ammonium clycolate<br>Ammonium malate | 12.10<br>12.50 | 6.0 | 0.300 | 0.526 | Formed trace of reaction precipitate at 24 hrs.; small amount at 48 hours. |
| | | 8.0 | 0.434 | 0.709 | Do. |
| | | 10.0 | 0.334 | 0.726 | No reaction precipitate formed at 48 hours. |
| | | 10.0 | 0.542 | 0.709 | No reaction precipitate formed at 72 hours; dissolved 0.817 lbs./gal. in 72 hrs. |
| Ammonium glycolate<br>Ammonium malate | 9.68<br>15.0 | 10.0 | 0.334 | 0.542 | Trace of reaction precipitate at 72 hrs.; dissolved 0.684 lbs./gal. in 72 hrs. |
| Potassium glycolate<br>Potassium malate | 7.5<br>23.40 | 6.0 | 0.476 | 0.501 | Formed trace of reaction precipitate at 24 hrs.; small amount at 48 hrs. |
| | | 8.0 | 0.467 | 0.501 | Do. |
| | | 10.0 | 0.309 | 0.442 | No reaction precipitate at 24 hrs.; small amount formed at 48 hrs. |
| Potassium glycolate<br>Potassium malate | 15.01<br>15.6 | 6.0 | 0.117 | 0.142 | Formed small amount of reaction precipitate at 24 hrs. |
| | | 8.0 | 0.225 | 0.409 | Do. |
| | | 10.0 | 0.209 | 0.259 | Do. |
| Potassium glycolate<br>Potassium malate | 7.505<br>23.40 | 8.0 | 0.05 | 0.117 | Do. |
| Sodium glycolate | 6.44 | 6.0 | 0.141 | 0.175 | Formed reaction precipitate. |
| | | 8.0 | 0.132 | 0.133 | Do. |
| | | 10.0 | 0.100 | 0.500 | Do. |
| Do | 12.88 | 6.0 | 0.200 | 0.283 | Do. |
| | | 8.0 | 0.175 | 0.267 | Do. |
| | | 10.0 | 0.175 | 0.275 | Do. |
| Do | 25.76 | 6.0 | 0.138 | 0.281 | Do. |
| | | 8.0 | 0.096 | 0.221 | Do. |
| | | 10.0 | 0.063 | 0.072 | Do. |
| Potassium glycolate | 7.5 | 6.0 | 0.100 | 0.150 | Do. |
| | | 8.0 | 0.091 | 0.158 | Do. |
| | | 10.0 | 0.108 | 0.166 | Do. |
| Do | 15.01 | 6.0 | 0.025 | 0.075 | Do. |
| | | 8.0 | 0.008 | 0.058 | Do. |
| | | 10.0 | 0.058 | 0.148 | Do. |
| Do | 30.02 | 6.0 | 0.183 | 0.367 | Do. |
| | | 8.0 | 0.208 | 0.342 | Do. |
| | | 10.0 | 0.350 | 0.417 | Do. |
| Ammonium glycolate | 6.05 | 6.0 | 0.08 | 0.141 | Do. |
| | | 8.0 | 0.09 | 0.141 | Do. |
| | | 10.0 | 0.100 | 0.141 | Do. |
| Do | 12.10 | 6.0 | 0.216 | 0.308 | Do. |
| | | 8.0 | 0.216 | 0.325 | Do. |
| | | 10.0 | 0.225 | 0.325 | Do. |
| Do | 24.2 | 6.0 | 0.350 | 0.525 | Do. |
| | | 8.0 | 0.358 | 0.578 | Do. |
| | | 10.0 | 0.191 | 0.442 | Do. |
| Sodium malate | 5.85 | 6.0 | 0.083 | 0.125 | Do. |
| | | 8.0 | 0.108 | 0.134 | Do. |
| | | 10.0 | 0.117 | 0.259 | Do. |
| Do | 11.7 | 6.0 | 0.284 | 0.300 | Do. |
| | | 8.0 | 0.217 | 0.234 | Do. |
| | | 10.0 | 0.200 | 0.242 | Do. |
| Do | 23.4 | 6.0 | 0.250 | 0.576 | Do. |
| | | 8.0 | 0.325 | 0.517 | Do. |
| | | 10.0 | 0.267 | 0.470 | Do. |
| Potassium malate | 15.6 | 6.0 | 0.292 | 0.300 | Do. |
| | | 8.0 | 0.147 | 0.200 | Do. |
| | | 10.0 | 0.250 | 0.250 | Do. |
| Do | 31.20 | 6.0 | 0.095 | 0.309 | Do. |
| | | 8.0 | 0.084 | 0.250 | Do. |
| | | 10.0 | 0.041 | 0.258 | Do. |
| Ammonium malate | 6.25 | 6.0 | 0.83 | 0.125 | Do. |
| | | 8.0 | 0.108 | 0.134 | Do. |
| | | 10.0 | 0.117 | 0.117 | Do. |
| Do | 12.5 | 6.0 | 0.242 | 0.334 | Do. |
| | | 8.0 | 0.150 | 0.334 | Do. |
| | | 10.0 | 0.175 | 0.259 | Do. |
| Do | 25.0 | 6.0 | 0.576 | 0.601 | Do. |
| | | 8.0 | 0.501 | 0.668 | Do. |
| | | 10.0 | 0.401 | 0.640 | Do. |

EXAMPLE II

Table II, below, compares one embodiment of the present invention with compositions presently in general use for treating gypsum deposits.

TABLE II.—COMPARISON OF VARIOUS TYPES OF CHEMICALS USED FOR GYPSUM REMOVAL

[Vol.=100 ml.; Solvation period: 24 and 48 hrs.; Concentration=Wt. percent; Temperature=72° F.]

| | Gypsum removed (lbs./gal.) in— | | | | | |
|---|---|---|---|---|---|---|
| | 24 hrs. | | | 48 hrs. | | |
| Solvent types | Scale #1 | Scale #2 | Scale #3 | Scale #1 | Scale #2 | Scale #3 |
| Inorganic converters [1]: | | | | | | |
| 12% NH₄HCO₃-NaCO₃ | 0.06 | 0.0 | 0.03 | 0.06 | 0.1 | 0.03 |
| 30% KOH | 0.00 | 0.0 | 0.0 | 0.00 | 0.0 | 0.0 |
| 30% NaOH | 0.23 | 0.17 | 0.17 | 0.50 | 0.4 | 0.17 |
| Inorganic converters [2]: | | | | | | |
| 12% NH₄HCO₃-NaCO₃ | 0.35 | 0.37 | 0.40 | 0.6 | 0.74 | 0.80 |
| 30% KOH | 0.33 | 0.0 | 0.50 | 0.5 | 0.30 | 0.65 |
| 30% NaOH | 0.50 | 0.6 | 0.52 | 0.9 | 0.80 | 0.75 |
| Solvent [1]: Ammonium glycolate, 12.1%; Ammonium Malate, 12.5% | 0.62 | 0.62 | 0.40 | 0.85 | 0.80 | 0.75 |

[1] No acidizing after each solvation period.
[2] Acidized for 2 hours in 15% HCl after each solvation period.

Note.—Scale #1=quarry deposit, Southard, Okla. Scale #2=large crystal from Jordan Field, Andrews County, Tex. Scale #3=small needle-like crystals from Magutex Field, Andrews County, Tex.

EXAMPLE III

Test procedure

Twelve grams of Baker Analyzed Reagent Grade Gypsum Powder are placed in contact with 100 cubic centimeters of the solvent of this invention. The test solvent is agitated for two hours. The solvent, containing a residual amount of gypsum, is then filtered through a millipore apparatus using a preweighed 0.45 micron filter to determine the amount of gypsum taken into the solution by the solvent of the present invention. The test is conducted in triplicate.

TABLE III.—SOLUBILITY OF GYPSUM IN A MIXTURE OF AMMONIUM GLYCOLATE AND AMMONIUM MALATE

[Solvent vol.=100 cc.; Solvation period=2 hrs.; Solvent concentration = (12.5% by weight ammonium malate) (12.1% by weight ammonium glycolate)]

| Initial wt. of gypsum, gms. | Gms. gypsum dissolved | Lbs. gypsum dissolved/ gallon of solvent |
|---|---|---|
| 12 | 9.6 | 0.801 |
| 12 | 9.6 | 0.801 |
| 12 | 9.7 | 0.809 |

EXAMPLE IV

Test procedure

The purpose of this test is to determine the amount of gypsum which will be held in solution for extended periods of time.

Various amounts of Baker Analyzed Reagent Grade Gypsum powder are placed in contact with 100 cubic centimeters of the solvent of this invention. The powdered reagent grade gypsum is added in one gram increments at concentrations ranging from 6 to 12 grams respectively for each test solution. Visual observations are made initially and at time intervals of 24, 48, 72 and 96 hours.

The data below shows that a solvent consisting of a mixture of 12.1 percent by weight ammonium glycolate and 12.5 percent by weight ammonium malate will initially dissolve and complex about 9 grams of reagent grade gypsum per 100 cubic centimeters of solvent, and that after 24 hours it holds about 8 grams per 100 cubic centimeters in solution. The solvent capacity appeared to stabilize at about 8 grams of gypsum per 100 cubic centimeters of solvent (0.667 pounds of gypsum per gallon of solvent) and to maintain that amount of gypsum in solution for extended periods of time.

TABLE IV.—SOLUBILITY OF POWDERED REAGENT GRADE GYPSUM IN A MIXTURE OF AMMONIUM GLYCOLATE AND AMMONIUM MALATE

| | Gypsum dissolved (gm./100 cc.) and lbs./gal. | | | | | | |
|---|---|---|---|---|---|---|---|
| Time, hrs. | (6) 0.500 | (7) 0.584 | (8) 0.667 | (9) 0.751 | (10) 0.834 | (11) 0.917 | (12) 1.0 |
| Initially | Clear | Clear | Clear | Clear | Turbid | Turbid | Turbid. |
| 24 | do | do | do | turbid | do | do | Do. |
| 48 | do | do | do | do | do | do | Do. |
| 72 | do | do | do | do | do | do | Do. |
| 96 | do | do | do | do | do | do | Do. |

EXAMPLE V

Test procedure

Salts of polyamino-carboxylic acids are added to a solvent of the present invention in various concentrations to determine the effects on dissolution of gypsum. The test procedure of Example III is used to determine the amount of gypsum taken into solution by the various concentrations of the solvent plus the salts of the polyamino-carboxylic acids.

The test results do not indicate that the addition of the salts of the polyamino-carboxylic acids to the solvent of the present invention produce an unexpected result.

TABLE V

| | Gypsum dissolved (gms./100 cc.) |
|---|---|
| Solvent*+1% by weight ammonium salt of ethylenediaminetetraacetic acid | 9.8 |
| Solvent*+2% by weight ammonium salt of ethylenediaminetetraacetic acid | 10.89 |
| Solvent*+3% by weight ammonium salt of ethylenediaminetetraacetic acid | 11.15 |
| Solvent*+5% by weight ammonium salt of ethylenediaminetetraacetic acid | 12.0 |
| Solvent* | 9.6 |
| Solvent* containing 1% by weight ammonium salt of nitrilotriacetic acid | 10.95 |
| Solvent* containing 2% by weight ammonium salt of nitrilotriacetic acid | 11.63 |

TABLE V—Continued

| | |
|---|---|
| Solvent* containing 3% by weight ammonium salt of nitrilotriacetic acid | 11.89 |
| Solvent* containing 5% by weight ammonium salt of nitrilotriacetic acid | 11.91 |

*Solvent=12.1% by weight ammonium glycolate; 12.5% by weight ammonium malate.

The above disclosure is illustrative and descriptive of the present invention and suitable variations may be made without departing from the spirit and scope of the invention.

Having described my invention, that which is claimed is:

1. A solvent for gypsum consisting essentially of an aqueous solution of a combination of a first salt and a second salt, wherein said combination of salts is selected from the group consisting of a first ammonium salt and a second ammonium salt, a first sodium salt and a second sodium salt, a first potassium salt and a second potassium salt, and a first lithium salt and a second lithium salt, all of said first salts being salts of glycolic acid and all of said second salts being salts of malic acid; said first salt is present in said solution in a concentration in the range of about 11 to about 14 percent by weight of said solution, said second salt is present in said solution in a concentration in the range of about 11 to about 14 percent by weight of said solution, and said solvent has a pH in the range of about 7 to about 14.

2. The solvent of claim 1 wherein said first salt and said second salt are present in said solution in substantially equal concentrations.

3. The solvent of claim 1 wherein said pH is about 10.

4. The solvent of claim 1 wherein said first salt and said second salt are ammonium salts.

5. The solvent of claim 1 wherein said first salt and said second salt are sodium salts.

6. The solvent of claim 1 wherein said first salt and said second salt are potassium salts.

7. The solvent of claim 4 wherein said pH is about 10.

8. The solvent of claim 7 wherein said solvent further contains a surface active agent selected from the group consisting of cationic, anionic, nonionic, and amphoteric surface active agents.

9. A process for removing gypsum deposits from surfaces, comprising contacting said deposits with a sufficient amount of solvent to avoid the formation of a reaction precipitate, maintaining said contact for a time sufficient to substantially dissolve said deposits, and thereafter terminating said contact, wherein said solvent consists essentially of an aqueous solution of a combination of a first salt and a second salt, wherein said combination of salts is selected from the group consisting of a first ammonium salt and a second ammonium salt, a first sodium salt and a second sodium salt, a first potassium salt and a second potassium salt, and a first lithium salt and a second lithium salt, all of said first salts being salts of glycolic acid and all of said second salts being salts of malic acid; said first salt is present in said solution in a concentration in the range of about 11 to about 14 percent by weight of said solution, said second salt is present in said solution in a concentration in the range of about 11 to about 14 percent by weight of said solution, and said solvent has a pH in the range of about 7 to about 14.

10. The process of claim 9 wherein said amount of solvent is in the range of about 0.7 to 0.9 pounds gypsum per gallon of solvent.

11. The process of claim 10 wherein said first salt and said second salt are ammonium salts.

12. The process of claim 11 wherein said pH is about 10.

13. A process for removing gypsum deposits from surfaces comprising contacting said deposits with a sufficient quantity of gypsum solvent to produce a water soluble precipitate, maintaining said contact for a time sufficient to substantially dissolve such deposits and thereafter terminating said contact, wherein said solvent consists essentially of an aqueous solution of a combination of a first salt and a second salt, wherein said combination of salts is selected from the group consisting of a first ammonium salt and a second ammonium salt, a first sodium salt and a second sodium salt, a first potassium salt and a second potassium salt, and a first lithium salt and a second lithium salt, all of said first salts being salts of glycolic acid and all of said second salts being salts of malic acid; said first salt is present in said solution in a concentration in the range of about 11 to about 14 percent by weight of said solution, said second salt is present in said solution in a concentration in the range of about 11 to about 14 percent by weight of said solution, and said solvent has a pH in the range of about 7 to about 14.

References Cited

UNITED STATES PATENTS

| | | | |
|---|---|---|---|
| 3,118,793 | 1/1964 | Maloney et al. | 134—41 X |
| 3,639,278 | 2/1972 | Hwa | 252—82 |
| 3,639,279 | 2/1972 | Gardner et al. | 252—8.55 B X |
| 3,696,040 | 10/1972 | Mayo | 252—87 |
| 3,696,044 | 10/1972 | Rutledge | 134—41 X |

LEON D. ROSDOL, Primary Examiner

H. A. PITLICK, Assistant Examiner

U.S. Cl. X.R.

252—8.55 B; 134—3, 41